(12) United States Patent
Mc Call

(10) Patent No.: US 7,248,151 B2
(45) Date of Patent: Jul. 24, 2007

(54) VIRTUAL KEYPAD FOR VEHICLE ENTRY CONTROL

(75) Inventor: Clark E. Mc Call, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 185 days.

(21) Appl. No.: 11/030,357

(22) Filed: Jan. 5, 2005

(65) Prior Publication Data

US 2006/0145825 A1 Jul. 6, 2006

(51) Int. Cl.
*B60R 25/10* (2006.01)
*B60Q 1/00* (2006.01)

(52) U.S. Cl. ............... 340/426.35; 340/425.5; 340/5.2; 341/22; 382/115; 345/7

(58) Field of Classification Search ............ 340/426.35
See application file for complete search history.

(56) References Cited

U.S. PATENT DOCUMENTS

| 4,688,037 | A | * | 8/1987 | Krieg | 340/825.72 |
| 4,818,048 | A | * | 4/1989 | Moss | 345/7 |
| 5,784,036 | A | * | 7/1998 | Higuchi et al. | 345/7 |
| 5,969,698 | A | * | 10/1999 | Richard et al. | 345/7 |
| 6,266,048 | B1 | * | 7/2001 | Carau, Sr. | 345/168 |
| 6,388,657 | B1 | * | 5/2002 | Natoli | 345/168 |
| 2003/0128188 | A1 | * | 7/2003 | Wilbrink et al. | 345/158 |

* cited by examiner

*Primary Examiner*—Donnie L. Crosland
(74) *Attorney, Agent, or Firm*—Timothy J. Marsh

(57) ABSTRACT

Method and apparatus are provided for vehicle entry control using an imaged keypad. The apparatus includes a virtual interface for entry control of a vehicle having an imaging surface that defines a field of view. The interface includes a projected keypad image on the imaging surface having at least one image of a reconfigurable key within the field of view and a gesture detector and translator having a scope of operation within the field of view. The image of the reconfigurable key may have a configuration based on a user preference.

20 Claims, 4 Drawing Sheets

VIRTUAL KEYPAD FOR VEHICLE ENTRY CONTROL

FIELD OF THE INVENTION

The present invention generally relates to vehicle entry control, and more particularly relates to vehicle entry control using an imaged keypad.

BACKGROUND OF THE INVENTION

Traditional entry control to a vehicle, namely obtaining access to an interior of the vehicle from a location exterior to the vehicle, is governed through use of a physical lock and key. Methods currently exist that allow the unlocking of a vehicle without the use of a physical device. These methods include entering an access code on a conventional keypad located on an exterior of the vehicle where the touchpad has keys labeled with numbers. For example, vehicles with a keyless entry keypad system have been available. This system uses a conventional touchpad mounted on an exterior of a driver's door near or within a door handle assembly or near the rear portion of the door.

While having an external touchpad for entry to the vehicle is convenient by eliminating the need for a key fob, the external touchpad is considered by many to be unattractive. The marketability of a vehicle including its various features, such as keyless entry, contributes to the demise or success of the vehicle. Additionally, by having an external location, the touchpad may be subject to tampering. For example, minimal physical access prevention, if any, stands between the externally located touchpad and a potential auto thief. Finally, once the external touchpad is installed on the vehicle, the configuration of the same is fixed and cannot be altered without substantial modification and cost. The ability to reconfigure the touchpad is useful particularly in colder climates or seasons where larger sized keys on the touchpad provide greater ergonomics.

Although interactive display systems exist, such as a combination display with touch screen or touch sensor pad, none of these systems adequately address the problem of external tampering. Because these systems are typically mounted on the exterior, some type of physical contact is normally required with the screen or pad. Any access to the interactive display system, such as keying an access code, is accomplished by a pressure, position, and/or movement from contact with the touch screen or touch sensor pad. Providing direct contact to the touch screen or touch sensor pad permits physical access and potential tampering.

Accordingly, it is desirable to provide a vehicle entry control system that uses a keypad accepting input external to the vehicle while limiting tampering of such keypad. In addition, it is desirable to provide a vehicle entry control system having a keypad that may be reconfigured in appearance according to a user's or driver's preference. Furthermore, other desirable features and characteristics of the present invention will become apparent from the subsequent detailed description of the invention and the appended claims, taken in conjunction with the accompanying drawings and this background of the invention.

BRIEF SUMMARY

According to various exemplary embodiments, an apparatus is provided for vehicle entry control having a virtual keypad. The apparatus includes an imaging surface located on a vehicle, an image generator positioned in an interior of the vehicle, a keypad image formed on the imaging surface by the image generator, and a means for detecting and interpreting a gesture. In other embodiments, a method is provided for vehicle entry control that includes projecting a keypad image onto the image projection surface, detecting a keypad gesture within a vicinity of the keypad image, interpreting the keypad gesture, determining an authorized keypad sequence, and permitting entry into the vehicle upon receipt of the authorized keypad sequence.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the drawings.

According to various embodiments, a vehicle entry control system has a virtual keypad projected onto an imaging surface of a vehicle, such as a windshield or window, from an interior of the vehicle. The control system uses gesture detection and recognition circuitry to authorize vehicle entry. Because the virtual keypad is projected onto a window or other surface, tampering of the keypad is limited to access from the interior of the vehicle. The virtual keypad may be reconfigurable in appearance according to a user's or passenger's preference.

Figure 1:
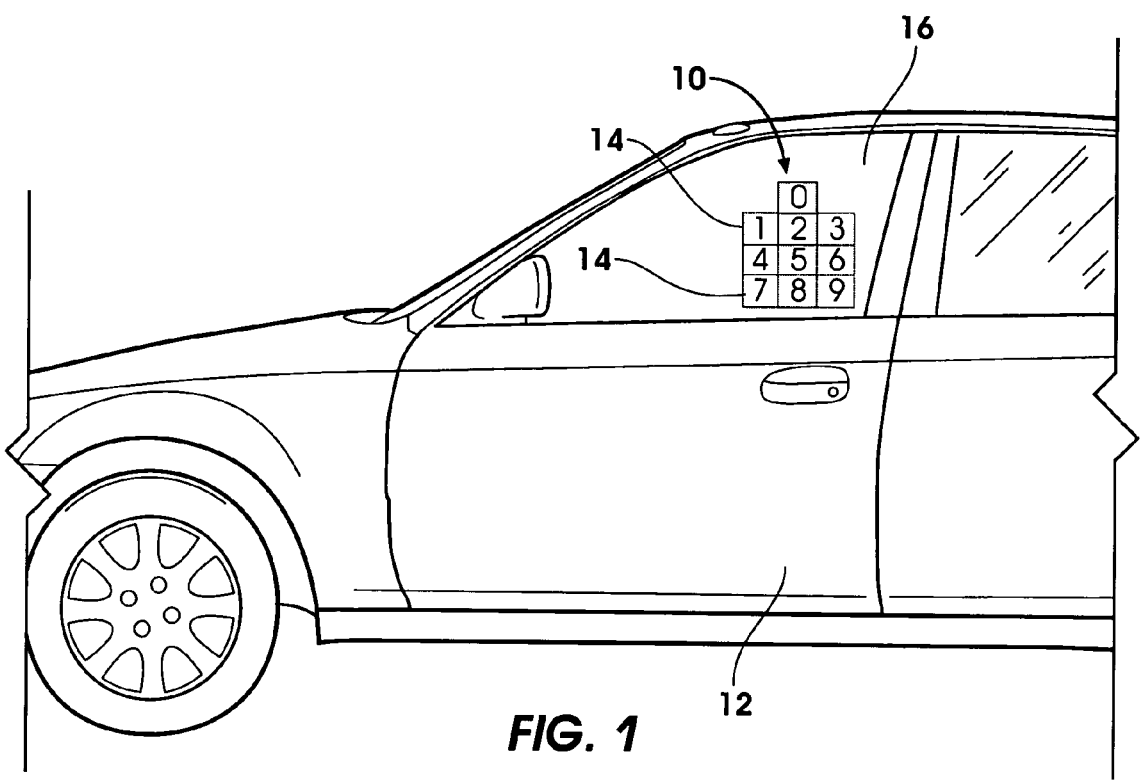
FIG. 1 is a side view of one embodiment of a virtual keypad projected onto a vehicle door.
Figure 2:
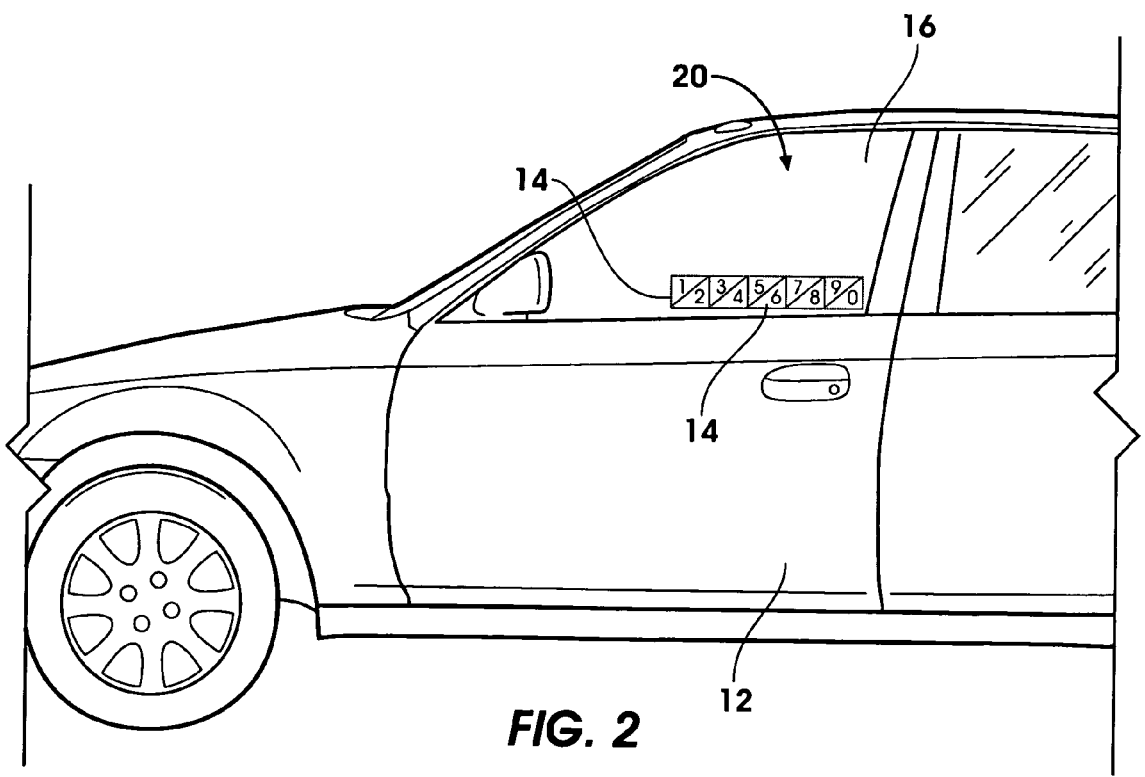
FIG. 2 is a side view of a second embodiment of a virtual keypad projected onto a vehicle door.

FIGS. 1 and 2 are side views of two embodiments of a virtual keypad, shown generally at 10 and 20, respectively, projected onto a vehicle door 12. An image of the keypad 10, 20 having keys 14 is generated by an image generator, described in greater detail hereinbelow, and projected onto an imaging surface 16, such as a driver-side window. FIG. 1 shows a keypad 10 in a calculator configuration having numerical characters as keys, and FIG. 2 shows a keypad 20 in an in-line configuration having numerical characters as keys. Although two embodiments of the keypad 10, 20 are shown from FIGS. 1 and 2, the keypad may take the appearance of a number of alternative configurations.

For example, the keypad may have a conventional matrix configuration, an amorphous configuration, or any other spatial configuration of keys. Additionally, the keys may have the appearance of a number of alternative characters that are selected from alphanumeric characters, symbols, graphical images, language-based text, or any combination thereof. For example, the keys may have the appearance of animal shapes. The particular configuration of the keypad and the appearance of the keys are not critical to the operation of the virtual entry control system and may be reconfigurable according to the passenger's preference.

Reconfiguration is accomplished by uploading predetermined configurations of keypads or customizable configurations to the virtual entry control system for projection by the image generator.

Figure 3:
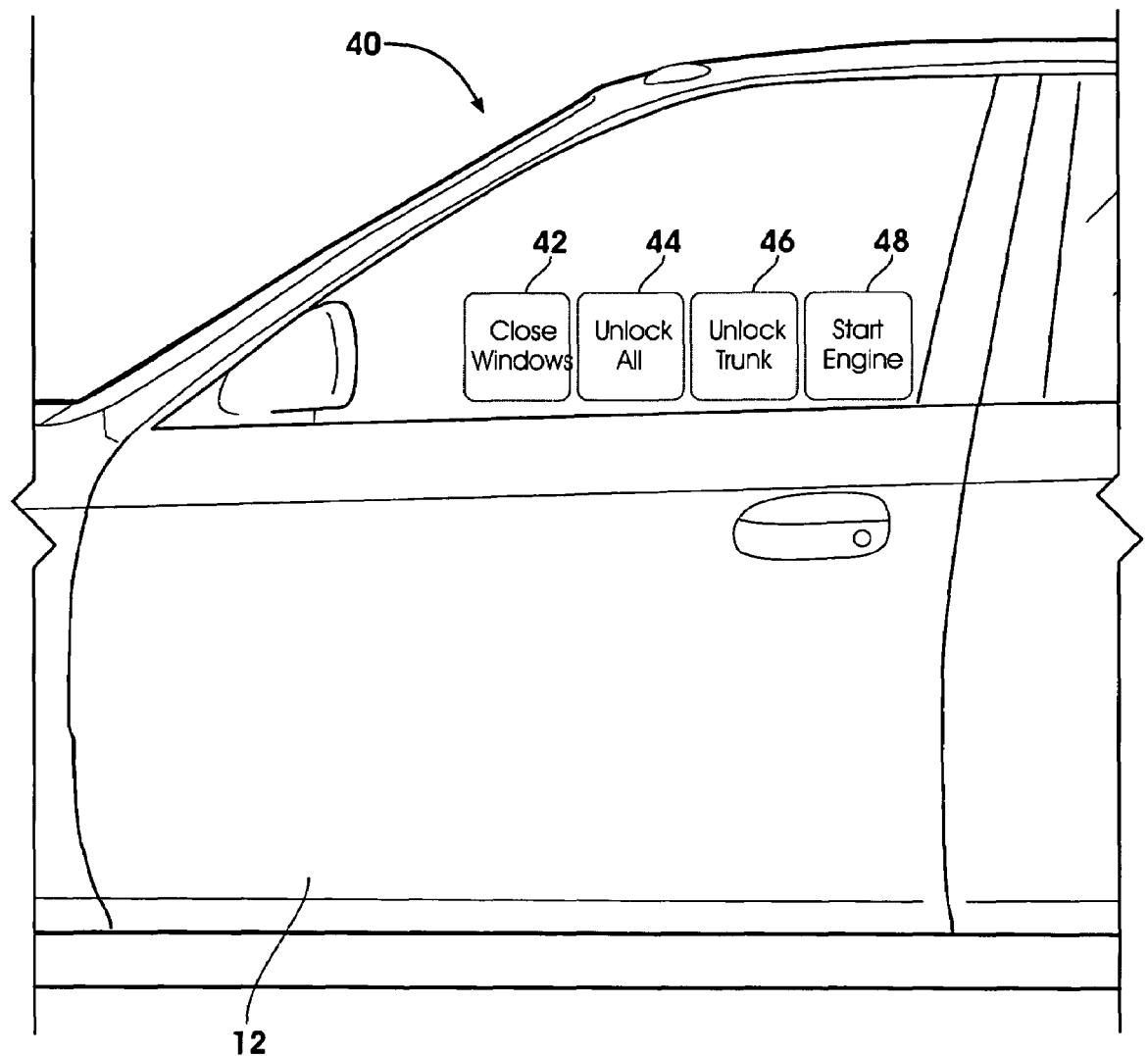
FIG. 3 is a side view of a third embodiment of a virtual keypad projected onto a vehicle door.

In addition to providing keys for entering an authorized entry code or sequence, the keypad image may contain keys having pre-designated functions. FIG. 3 is a side view of a third embodiment of a virtual keypad, shown generally at 40. In this embodiment, the keypad 40 includes keys 42, 44, 46, 48 having vehicle functions including, by of example and not of limitation, a Close Windows key 42, an Unlock All key 44, an Unlock Trunk key 46, and a Start Engine key 48. Those of skill in the art will appreciate that a variety of vehicle functions can be assigned to any number of keys of the keypad image.

The configuration and use of the keypad could be determined by a number of factors. These may include the state of the vehicle. For example, a locked vehicle may display a numeric keypad appropriate to entering an authorization code on a numeric keypad for unlocking, whereas an unlocked vehicle may display an alternative keypad set of choices and configuration such as for window up/down control or engine starting. In another example, certain vehicles offer passive unlocking of doors where vehicle doors are automatically unlocked when a door handle is lifted and a valid keyfob device is detected present. The detection of the presence of this type of device could also be used to control the configuration and choices available on the displayed keypad. Further, the displayed keypad could also be based on a preference determined by a passenger such as might be part of a vehicle personalization function.

The imaging surface 16 defines a field of view for the virtual keypad 10, 20 and may be a substantially transparent vehicle body component. Examples of ideal imaging surfaces include a windscreen, a windshield, and a window. Additionally, a particulate cloud may be used to provide an imaging surface as discussed in greater detail hereinbelow. Although a substantially transparent vehicle body component is shown in FIGS. 1 and 2, a substantially translucent or semi-translucent vehicle body component, such as an auto body panel, may be used as an equivalent imaging surface when a gesture detector, described in further detail hereinbelow, is located on the exterior of the vehicle.

Figure 4:
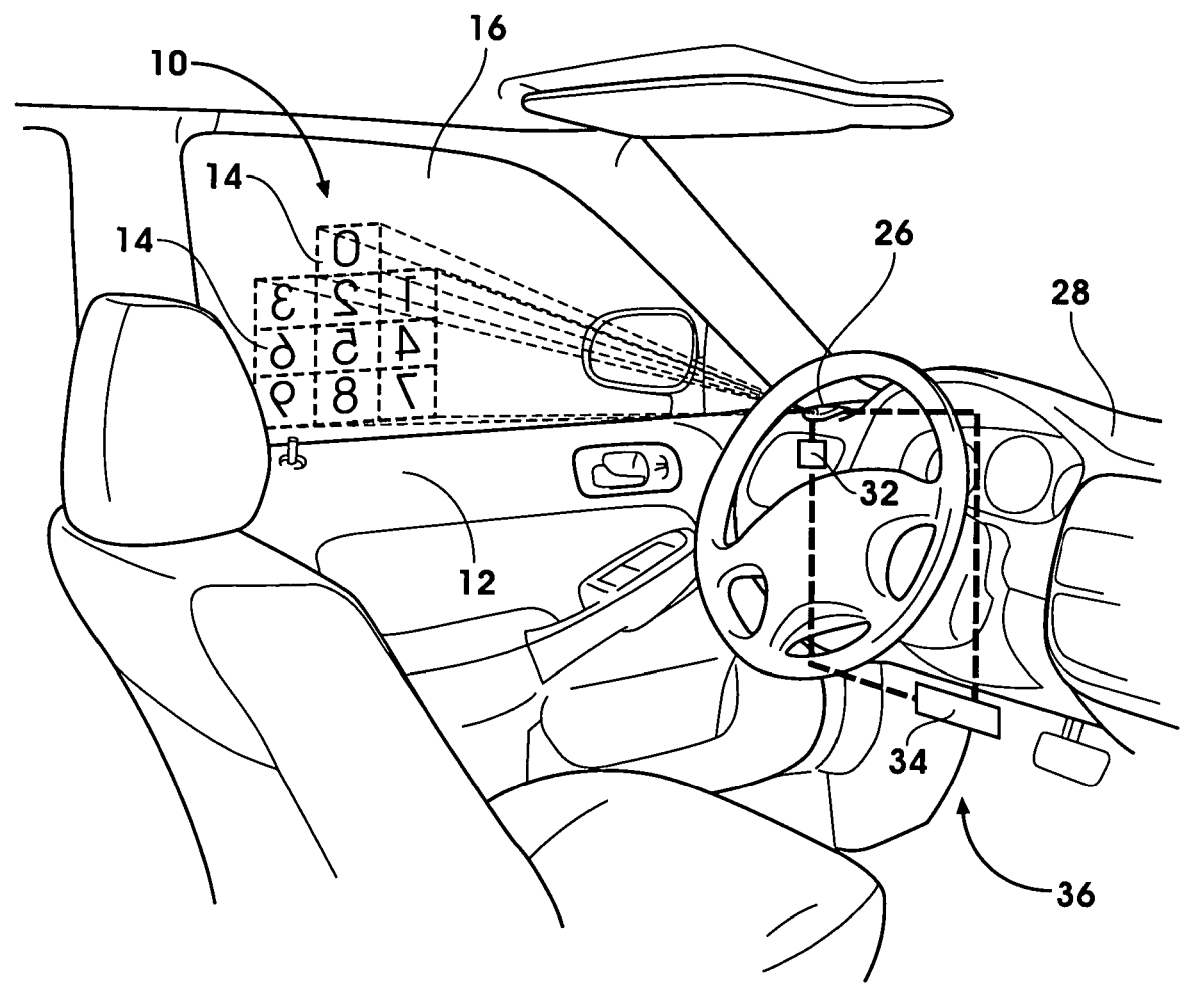
FIG. 4 is a perspective view of an image generator and a gesture detector positioned in the interior of a vehicle.

FIG. 4 is a diagrammatic view of an image generator 26, and a gesture detector, shown generally at 36, having a camera 32 positioned in the interior of the vehicle. The image generator 26 and camera 32 may be both positioned in the interior of the vehicle such that a direct line-of-sight (LOS) is provided between the image generator 26 and the imaging surface 16 and between the camera 32 and the imaging surface 16. In this embodiment, the image generator 26 and camera 32 are mounted to a dashboard 28 and both have a direct LOS to a windshield, as best shown in FIG. 4. The particular location of the image generator 26 in the interior of the vehicle is not critical to accomplish projection of the virtual keyboard 10 provided the image generator 26 has an unimpeded direct LOS with the imaging surface 16. For example, the image generator may alternatively be mounted to a center console located between a driver seat and a passenger seat to project the virtual keypad onto a front windshield. Alternatively, a variety of combinations of mirrors and lenses may be used with the image generator 26 to form and manipulate optical transmission so that a direct LOS is not required between the image generator 26 and the imaging surface 16.

The image generator 26 includes an image source such as a CRT, an LCD, digital light processing (DLP) unit, or a vacuum fluorescent device (VFD) and a projection optical system. The projection optical system includes a projection optical lens for projecting an image generated from the image source at an enlarged scale. A reflective mirror, lens, combiner, or any combination thereof may be used to manipulate the projected image depending on a desired image. Alternatively, a hologram may be used in conjunction with the image source and projection optical system to project the virtual keyboard on the imaging surface. Additionally, the ambient air adjacent to the image generator or imaging surface may be conditioned, such as adding condensate or particulate, to provide a light dispersing environment conducive to creating an image, such as a "cloud screen". In this embodiment, the image generator includes a particle cloud delivery device to create the light dispersing environment.

In one embodiment, the image generator 26 is a stand-alone unit having a memory and a processor to create the keypad image. Alternatively, the image generator 26 is connected to a separate processor and/or memory to create the keypad image. For example, the image generator 26 and gesture detector 32 may share a common processing unit 34. A library of pre-determined keypad images is optionally retained in a memory portion of the image source for selection of a keyboard image by the passenger.

For reconfiguration of the virtual keyboard, a driver interface may be located in the interior of the vehicle, such as on the dashboard for convenient access, and include a display and selection buttons that allow the driver to select the keyboard image. In an alternative embodiment, a variety of keyboard images are downloadable to the memory portion of the image source using a conventional port or connection thereby allowing the driver to customize the virtual keyboard. For example, a universal serial bus (USB) port is connected to the image generator to enable downloads of customized keyboard images.

The gesture detector 36 includes an optical data sampling system and a processor 34 or central processing unit (CPU) that recognizes gestures and determines an access code or sequence based on the gestures detected by the optical data sampling system 32 within a viewing area or field of view. The optical data sampling system may include a camera 32 that captures images of the field of view provided by the imaging surface 16. Alternatively, an infrared detector array may be used as the optical data sampling system, or any other structures or devices may be used. Although the location of the camera 32 is shown adjacent to the image generator 26, the location of the camera 32 in the interior of the vehicle is not critical to accomplish gesture recognition in the vicinity of the virtual keypad 10. For example, the camera 32 may alternatively be mounted to a center console or roof liner. Alternatively, the camera 32 may be located on the exterior of the vehicle such as adjacent to a rear view mirror or along an A-pillar.

A variety of methods may be used for gesture recognition based on Hidden Markov Model's (HMM's) or the like. An HMM is a model made up of interconnected nodes or states where each state contains information concerning itself and its relation to other states in the model. The processor 34 operates a gesture recognition algorithm or application based on images captured by the optical data sampling system. An example of a gesture detector system is a system for real-time gesture recognition using a video camera and computer system that captures a sequence of images and matches data points from such images with patterns of data points of known gestures. Alternative gesture detectors using infrared detector arrays for sampling data points are also suitable, as are any other devices or systems capable of sampling data points corresponding to a gesture.

In addition to optical data sampling systems, other data-gathering methods are available including using a touch panel that is built into the window or body panel of the vehicle that allows projection of the keypad image while sensing contact around the keypad image. In this embodiment, the touch panel is connected to the CPU, and the CPU performs gesture recognition based on the keypad image projected onto the same. Other methods of sensing contact and determining location of the contact may be used to accomplish gesture recognition. For example, one method of sensing includes determining a vibration or sound travel time of a touch or tap on the keypad image. The travel time is determined from the point of contact to a known position, such as a window edge or door panel end, and gesture recognition is subsequently determined.

The processor 34 of the gesture detector 36 is connected to a vehicle door-lock device, not shown, to activate the door-lock device upon entry and recognition of an authorized entry code or sequence. An electrical connection between the gesture detector to a vehicle CPU controlling the door-lock device, such as found in conventional electronic door lock features, may be used to unlock the electronic door lock. As previously mentioned, the gesture detector 36 recognizes gestures and determines whether the detected gesture or sequence of gestures matches a stored gesture or sequence of gestures corresponding to an authorized entry code or sequence. For example, an entry code of the sequence "0-1-2-3" using the virtual keypad shown in FIGS. 1A and 2 requires a specific hand gesture that touches or appears to touch a "0" key, a "1" key, a "2" key, and a "3" key of the virtual keypad in sequence. Upon detection and recognition of this specific hand gesture, the gesture detector 36 sends a signal to the vehicle door-lock device to unlock the door lock.

In operation, the processor 34 of the gesture detector 36 may be a microprocessor or other controller, such as an electronic control unit or power train control module commonly found on many production vehicles. In one embodiment, the processor 34 is implemented as a digital microcontroller with associated memory and input/output circuitry on a single board, although other hardware implementations could be used in alternate embodiments. The processor 34 obtains gesture data from the optical data sampling system 32. In one embodiment, the processor 34 computes the probability of the gesture data representing a gesture. In response to the computed data, the processor provides one or more control signals to the vehicle door-lock device that unlocks the door lock.

Figure 5:
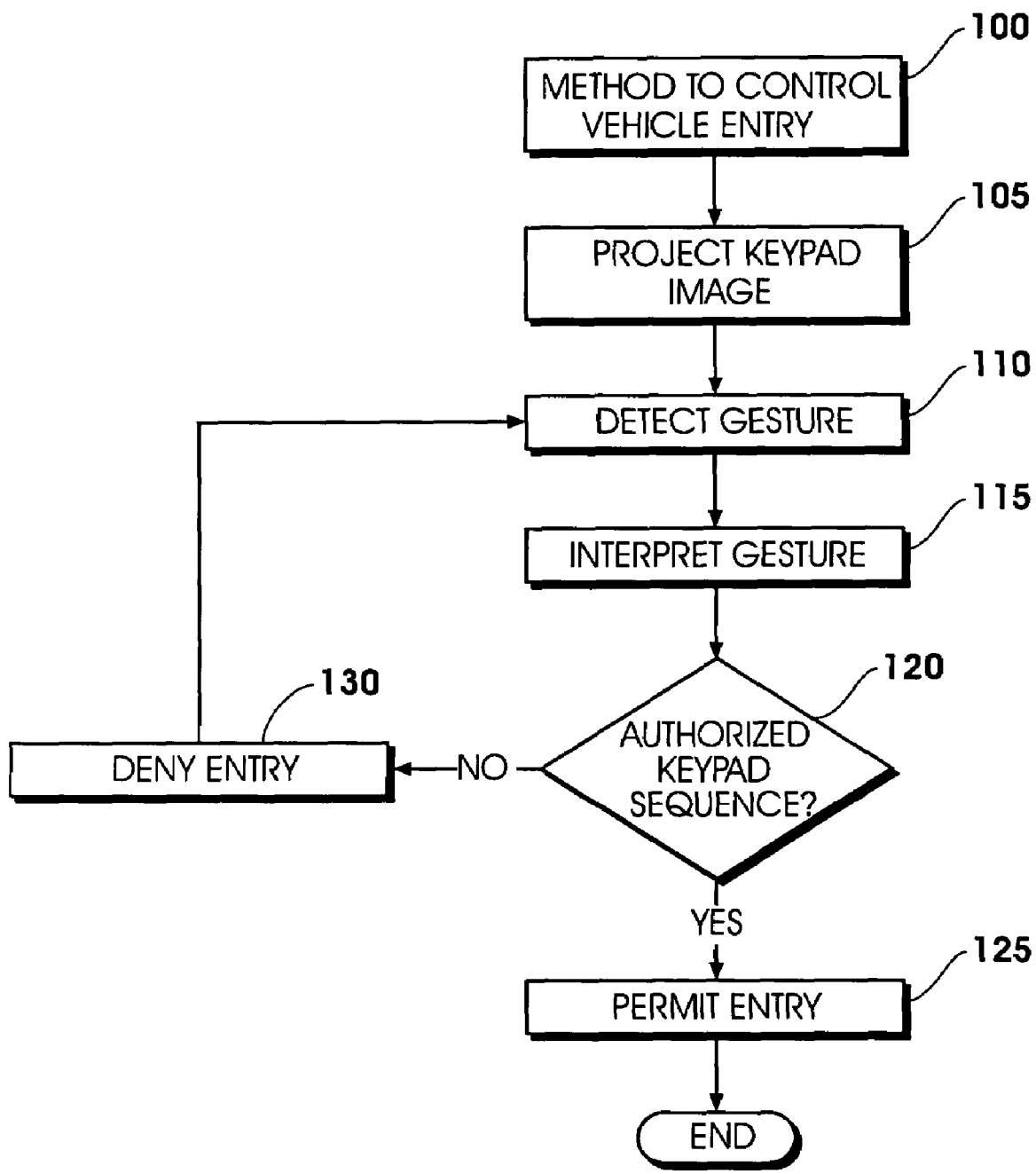
FIG. 5 is a flowchart of an exemplary method for vehicle entry control.

FIG. 5 is a flowchart of an exemplary method 100 for vehicle entry control. A keypad image 10 (FIGS. 1 and 4), 20 (FIG. 1), or virtual keypad, is projected at 105 by the image generator 26 (FIG. 2) onto the imaging surface 16 (FIG. 2). A gesture within the field of view of the keypad image 10 (FIGS. 1 and 4), 20 (FIG. 2) is detected at 110 by the camera 32 (FIG. 4) of the gesture detector 36 (FIG. 4). The gesture is interpreted at 115 by the processor 34 (FIG. 4) of the gesture detector 32 (FIG. 4). An authorized keypad sequence is determined based on the interpreted gesture at 120 by the processor 34 (FIG. 4). If an authorized keypad sequence is determined, entry is permitted to the vehicle at 125 by the processor 34 (FIG. 4) by transmitting at least one control signal to the vehicle door-lock system to unlock the door lock. If the keypad sequence is not authorized, entry is denied to the vehicle at 130 by the processor 34 (FIG. 4). In the embodiment shown in FIG. 4, after entry is denied to the vehicle at 130, the camera 32 (FIG. 4) continues to detect for a gesture at 110. In an alternative embodiment, after entry is denied to the vehicle at 130, the method ends without having the camera 32 (FIG. 4) detect for another gesture. The method 100 optionally includes selecting a keypad configuration for the keypad image to enable reconfiguration or customization of the keypad image.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An entry control system for providing a passenger with access to a vehicle having an imaging surface, said entry control system comprising:
   an image generator located within the vehicle and configured to produce a keypad image on the imaging surface;
   a camera configured to detect a gesture made by the passenger proximate to the keypad image; and
   a processor configured to interpret the gesture and to thereby grant or deny access to the vehicle.

2. An entry control system according to claim 1, wherein the imaging surface is selected from a windscreen, a windshield, and a window.

3. An entry control system according to claim 1, wherein said image generator comprises a transmissive optical element.

4. An entry control system according to claim 3, wherein said image generator further comprises a holographic combiner; and, wherein said transmissive optical element is a holographic optical element.

5. An entry control system according to claim 1, wherein the keypad image includes reconfigurable images of keys arranged in a passenger-selectable configuration.

6. An entry control system according to claim 5, wherein the images of keys are selected from alphanumeric characters, graphical characters, and language-based text.

7. An entry control system according to claim 5, wherein the configuration of the images of keys is selected from a two-dimension matrix, an in-line configuration, and an amorphous spatial configuration.

8. An entry control system according to claim 5, wherein the images of keys vary in size based on a passenger selection.

9. An entry control system according to claim 1, wherein said processor operates a gesture recognition algorithm.

10. An entry control system according to claim 1, wherein said camera comprises at least one infrared detector array; and wherein said processor operates a gesture recognition algorithm.

11. An entry control system according to claim 1 further comprising a door-lock interface electrically connected with said processor, wherein said door-lock interface is activated by said processor.

12. A virtual interface for entry control of a vehicle having an imaging surface, the imaging surface defining a field of view, said interface comprising:
   a projected keypad image on the imaging surface having at least one image of a reconfigurable key within the field of view, said at least one image of a reconfigurable key having a configuration based on a user preference; and
   a gesture detector configured to:
      recognize a gesture corresponding to the projected keypad image; and
      generate a vehicle entry sequence based at least in part on the gesture.

13. A virtual interface according to claim 12, wherein said at least one image of a reconfigurable key is selected from alphanumeric characters, graphical characters, and language-based text.

14. A virtual interface according to claim 12, wherein said configuration of said at least one image of a reconfigurable key is selected from a two-dimension matrix, an in-line configuration, and an amorphous spatial configuration.

15. A virtual interface according to claim 12, wherein said at least one image of a reconfigurable key varies in size based on a user selection.

16. A virtual interface according to claim 12, wherein said keypad image is a holographic image.

17. A method of controlling entry to a vehicle having an image projection surface, said method comprising the steps of:
   projecting a keypad image onto the image projection surface;
   detecting a keypad gesture within a vicinity of the keypad image;
   interpreting the keypad gesture;
   determining an authorized keypad sequence; and
   permitting entry into the vehicle upon receipt of the authorized keypad sequence.

18. A method according to claim 17 further comprising selecting a keypad configuration for the keypad image.

19. A method according to claim 17, wherein said interpreting step comprises:
   comparing the detected keypad gesture with stored gestures; and
   matching the detected keypad gesture with at least one of the stored gestures.

20. A method according to claim 17, wherein said determining step comprises comparing the interpreted gesture with the authorized keypad sequence.

* * * * *

UNITED STATES PATENT AND TRADEMARK OFFICE
CERTIFICATE OF CORRECTION

| | | |
|---|---|---|
| PATENT NO. | : 7,248,151 B2 | Page 1 of 1 |
| APPLICATION NO. | : 11/030357 | |
| DATED | : July 24, 2007 | |
| INVENTOR(S) | : Clark E. McCall | |

It is certified that error appears in the above-identified patent and that said Letters Patent is hereby corrected as shown below:

On the Title Page Item (75) Inventor: "Clark E. Mc Call" should be changed to --Clark E. McCall--.

Signed and Sealed this
Eighth Day of February, 2011

David J. Kappos
*Director of the United States Patent and Trademark Office*